Aug. 31, 1954     L. A. STORZ     2,687,582
ASTRONOMY AND CELESTIAL NAVIGATION TEACHING DEVICE
Filed July 21, 1952     5 Sheets-Sheet 1

INVENTOR.
Leon A. Storz
BY
Clayton L. Jenks
ATTORNEY

Aug. 31, 1954 — L. A. STORZ — 2,687,582
ASTRONOMY AND CELESTIAL NAVIGATION TEACHING DEVICE
Filed July 21, 1952 — 5 Sheets-Sheet 2
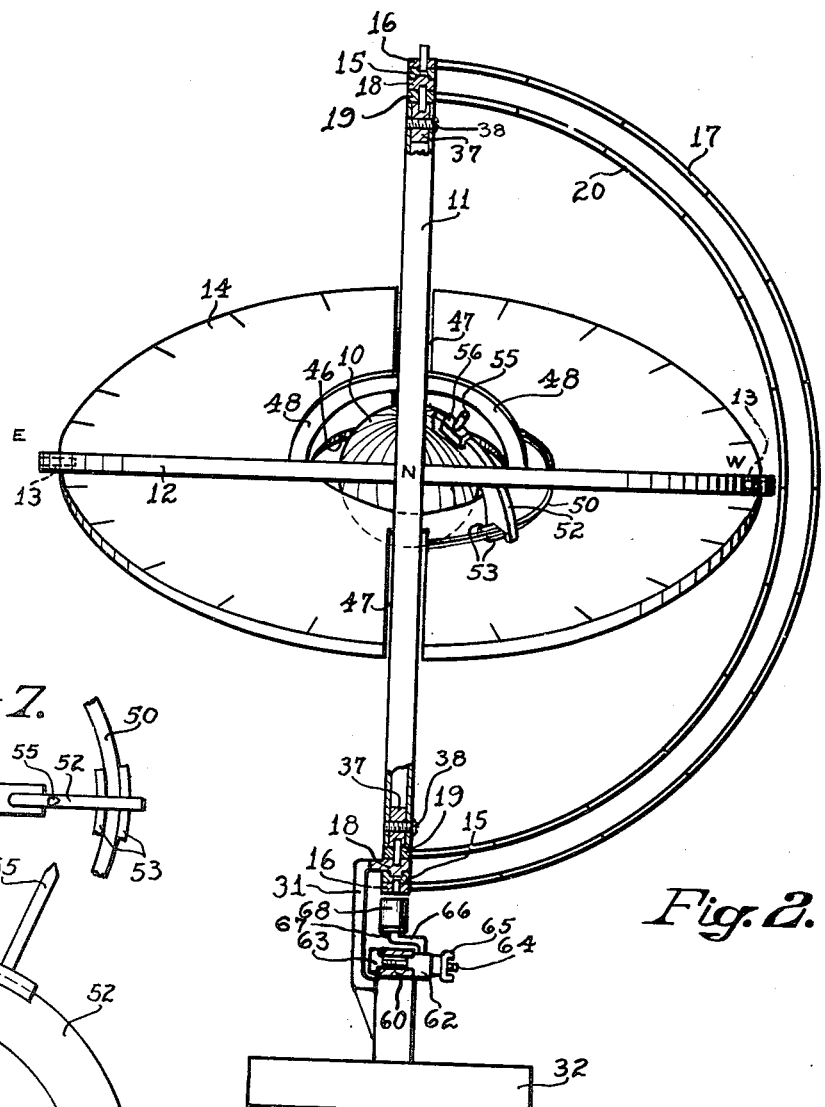
Fig. 2.
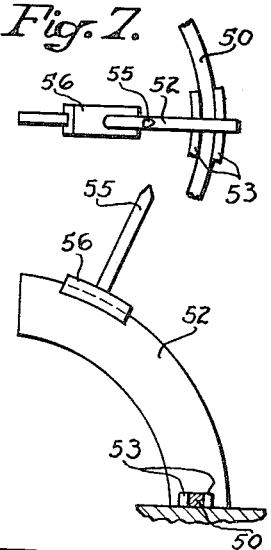
Fig. 7.
Fig. 6.
INVENTOR.
Leon A. Storz
BY
Clayton L. Jencks
ATTORNEY

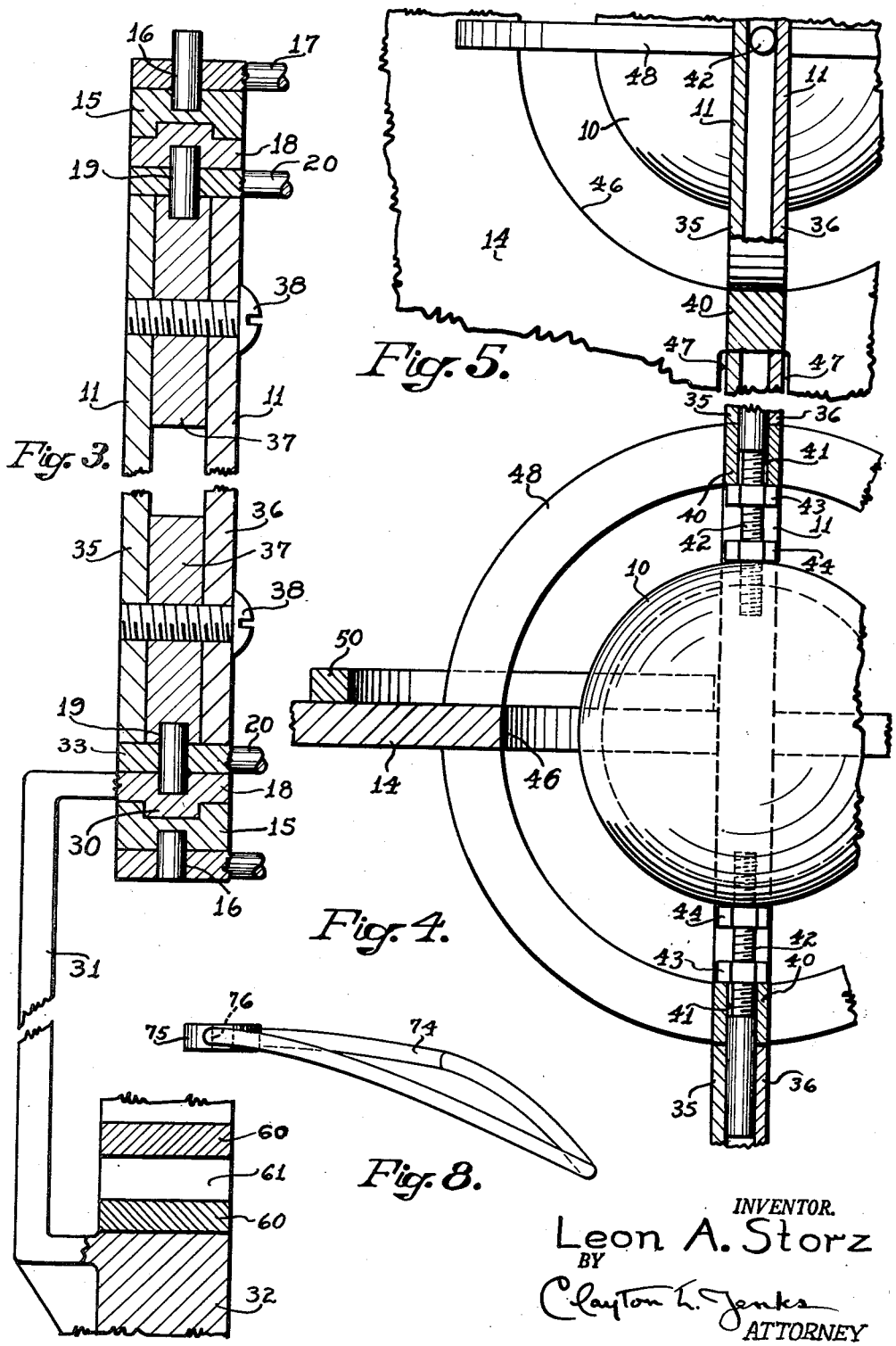

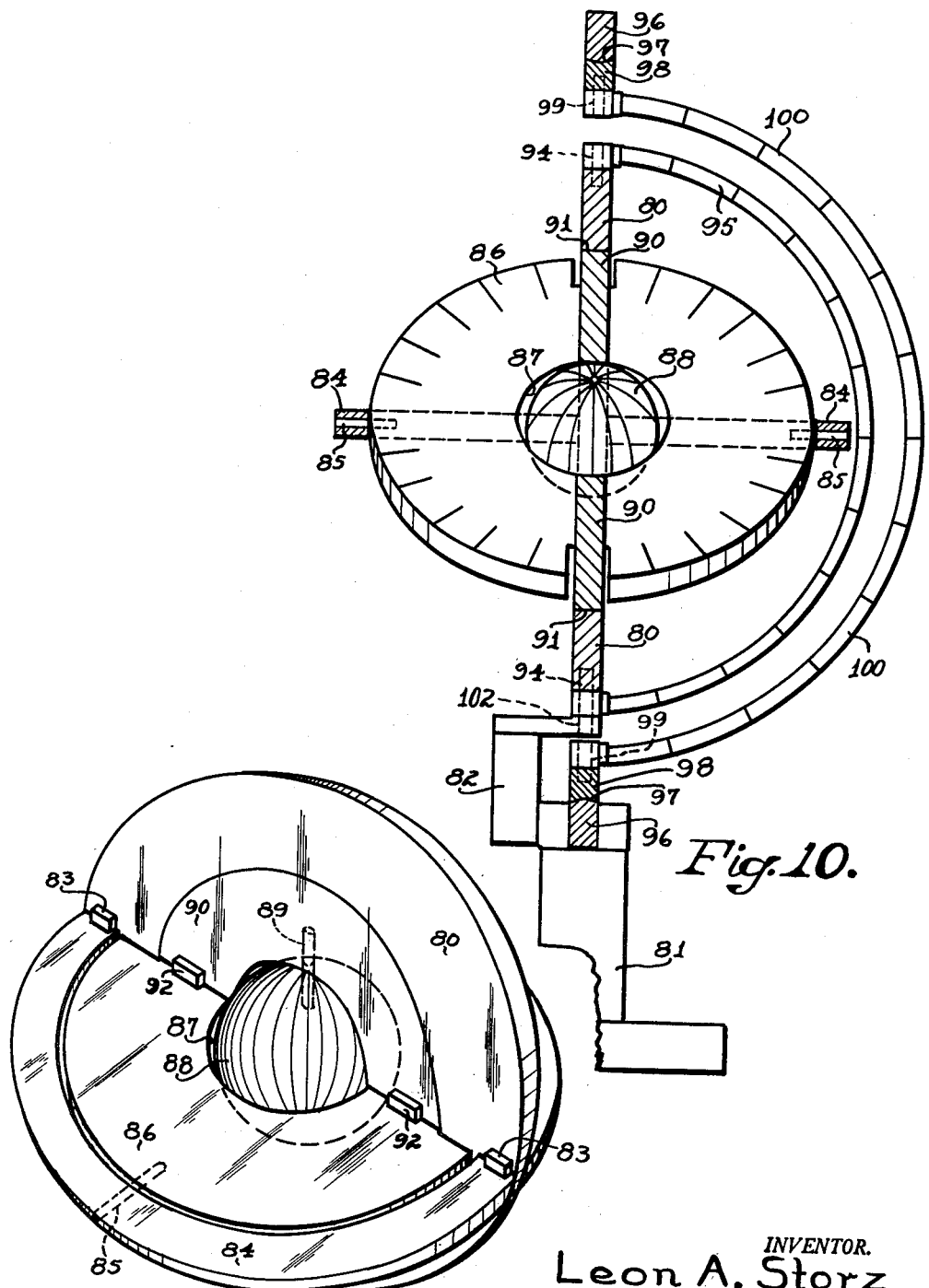

Patented Aug. 31, 1954

2,687,582

UNITED STATES PATENT OFFICE 2,687,582

ASTRONOMY AND CELESTIAL NAVIGATION TEACHING DEVICE

Leon A. Storz, Worcester, Mass.

Application July 21, 1952, Serial No. 300,083

16 Claims. (Cl. 35—43)

This invention relates to an astronomy and celestial navigation teaching device, and particularly one which demonstrates various astronomical principles and the relative positions and apparent movements of celestial bodies.

The science of teaching astronomy or celestial navigation is particularly handicapped by the students' inability to visualize celestial coordinates. The observer at any point on the earth must consider himself as standing at the center of the earth and celestial sphere, and his problem is to visualize in their actuality the apparent locations and movements of celestial bodies with relation to his earth position. Various types of instruments have been proposed for use as astronomical measuring instruments and particularly in the art of navigation, but these are not readily used to demonstrate the apparent locations and movements of such bodies. Other devices have been proposed for illustrating the relative positions and actual movements of the bodies of the celestial sphere and the earth, but their use has taxed the students' power of visualizing celestial coordinates and the apparent movements of stars or other bodies.

One object of this invention is to provide a simple form of device which will serve to demonstrate many of the celestial coordinates and the apparent movements and locations of various bodies for the solution of student problems.

In accordance with my invention, I have provided a device which represents two systems of celestial coordinates, one on the planes of the horizon and the celestial meridian, and the other on the planes of the equinoctial and the celestial meridian. One system is termed the horizon system and indicates the altitude and azimuth of various celestial bodies relative to the observer's horizon and the azimuth angle between the vertical circle and the celestial meridian. The other system is the equinoctial system which can demonstrate an elevated north or south pole for any latitude and show the approximate hour angle, the declination, and the angle "t" between the hour circle and the meridian, as well as demonstrate the daily path of a celestial body around the earth. By a combination of the two systems, the celestial triangle and other features may be demonstrated.

A further object of the invention is therefore to demonstate the reduction of the celestial sphere to the plane of the celestial meridian, the plane of the equinoctial and the plane of the horizon.

Another object is to provide an actual demonstration of the movable hour and vertical circles which indicate the position of a body in its apparent path around the earth.

Another object of the invention is therefore to provide a simple form of device in which these two systems are so represented that celestial coordinates found in both of the systems may be readily explained and demonstrated.

Another object is satisfied by making the device of transparent material so that the various device parts may be readily seen in all positions. Further objects will be apparent in the following disclosure.

A suitable device for demonstrating these two systems of coordinates may comprise plate shaped parts representing a horizon system and other plate shaped parts, an equinoctial system, which have the celestial meridian in common. This construction comprises relatively immovable parts indicating the horizontal horizon and the vertical meridian. A globe or other part representing the earth and a member tiltable therewith indicating the equinoctial plane are adjustable in position according to the observer's latitude. Arcuate members swing about the globe and demonstrate the vertical and hour circles and the paths of celestial bodies relative to the earth.

These various features are illustrated in the drawings representing preferred embodiments of the invention in which:

Fig. 2 is a vertical elevation partly in section, taken at right angles to Fig. 1;

Fig. 3 is an enlarged central vertical section, partly broken away, of the celestial meridian plate and associated parts;

Fig. 4 is a fragmentary vertical elevation of the central portion of the meridian plate which shows the globe mounting;

Fig. 5 is a fragmentary view corresponding with and taken at right angles to Fig. 4;

Fig. 6 is a fragmentary elevational detail of the star pointer and its mount;

Fig. 7 is a top plan view of the pointer of Fig. 6;

Fig. 8 is an elevation of an accessory part showing a celestial triangle;

Fig. 10 is an elevation at right angles to the view of Fig. 9; and

Fig. 11 is a perspective detail view showing the relationship of parts associated as the fixed celestial meridian and horizon and the pivoted equinoctial disk and globe.

Figure 1:
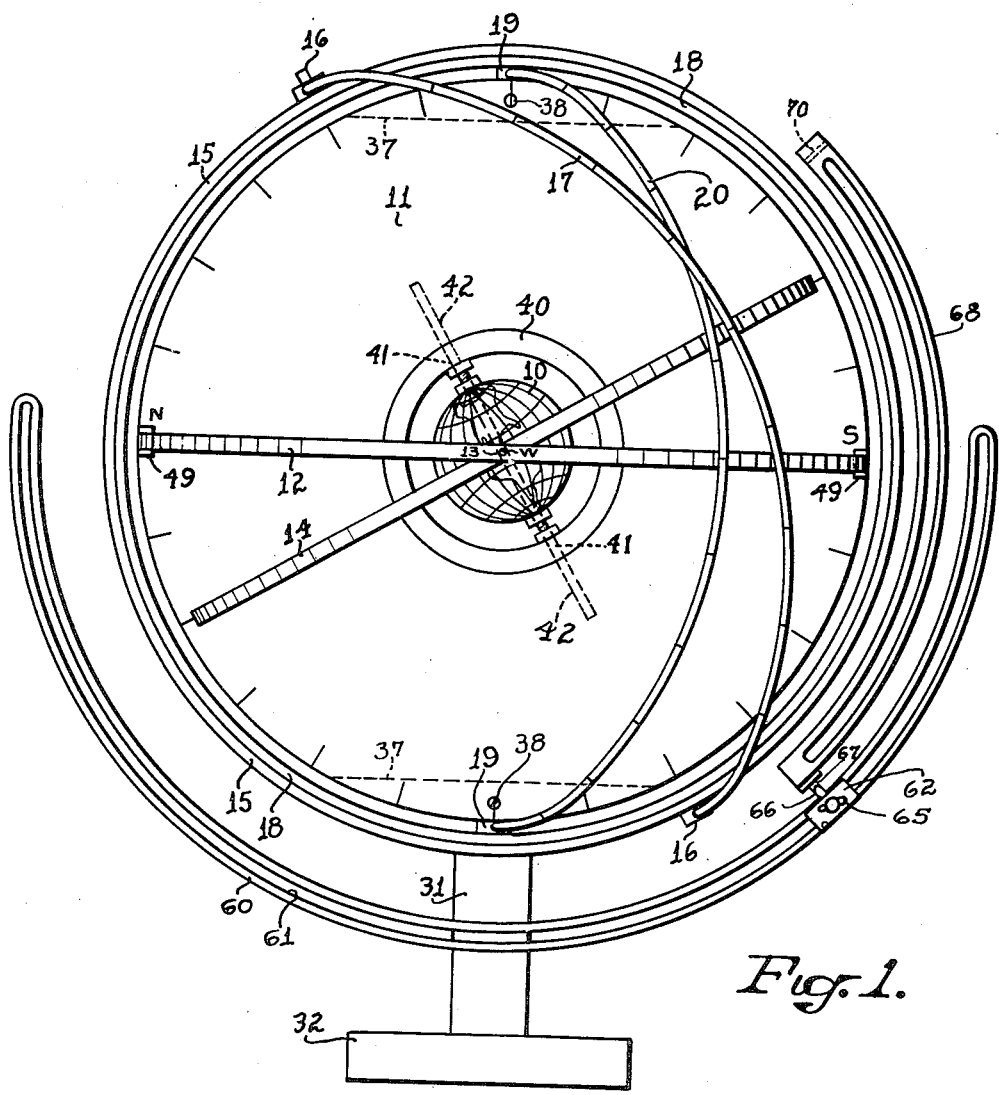
Fig. 1 is vertical elevation of one form of device, which shows the equinoctial plane and the globe tilted to a given latitude angle.

Referring first to Figs. 1 to 5 inclusive, the various parts of this device are mounted in relation to a center point, such as one indicated by the center of a centrally positioned globe 10 representing the earth, and the center of that globe is presumed to be the position of an observer who is using the device. A circular plate or ring 11 of substantially transparent material, such as an acrylic resin or other plastic, is mounted to be vertical relative to the center of that globe. This plate indicates the celestial meridian for the position of the observer. The celestial meridian represents the vertical plane passing through the observer and his zenith and through the north and south celestial poles. For clarity of description, the various parts will be designated by their demonstration functions, such as celestial meridian 11. A horizontal plate or ring 12 concentric with the globe indicates the rational horizon for that person at the globe center. This horizon ring 12 is fixed rigidly to be horizontal relative to the vertical meridian 11 and with its center in the meridian plane. The ring 12 is marked in degrees and carries designations N. E. S. W. representing the north, east, south and west points on the horizon which are to be suitably oriented for the demonstrations with the observer at the west. The rings 11 and 12, together with a member representing the vertical circle, constitute the horizon system.

The equinoctial system includes the same meridian 11 and a plate shaped member 14 indicating the equinoctial plane. Diametrically arranged pivot bearings 13 (Fig. 2) are mounted at the marked east and west points on the fixed horizon ring 12, and these pivotally support diametrically a transparent bifurcated plate or disk 14 carrying the globe 10 which are tiltable relative to the horizon plane to indicate latitude. The bifurcation of the disk 14 provides two connected substantially semi-circular pieces on opposite sides of the vertical meridian plate 11 and permits the disk 14 to be swung as a unit to various angles relative to the horizon plane 12. This disk 14 indicates the equinoctial plane which passes through the equator of the globe 10 and is considered to be a continuation of the plane of the earth's equator at right angles to the elevated earth poles. It has the 24 hours of day marked thereon. The equinoctial plane 14 and the globe 10 carried thereby are tiltable as a unit about the pivot axis 13 on the horizon plane into various latitude positions, so that the plane 14 may make that angle with the horizon which corresponds with the observer's latitude and so indicate the correct relationship of earth and bodies moving thereabout in their apparent motion. In Fig. 1 the tilt of the earth and equinoctial plane corresponds with the latitude of 60 degrees north.

An outer latitude determining ring 15 (Fig. 1) is slidably mounted outside of and concentric with the meridian plane 11 so that it may be revolved substantially in the plane of the celestial meridian 11. This ring 15 is concentric with the globe 10, and it is arranged to be slid around outside of the vertical meridian plate 11 into various latitude designating positions relative to the celestial meridian. The latitude ring 15 carries two diametrically arranged outwardly projecting pivots 16 on which are pivotally mounted the two ends of a half circle rod 17 formed of an acrylic resin. This rod 17 is termed the hour circle, and it is calibrated or provided with spaced markings, such as 15 degrees apart, for representing the declination of a celestial body. The upper pivot 16 designates the north elevated pole, and the lower pivot is the south elevated pole. The latitude ring 15 is slidably mounted on a supporting ring 18 (Fig. 3) concentric with the vertical celestial meridian 11. The ring 18 has two inwardly projecting diametrically arranged pivots 19 carrying another half circle rod 20 of resin. The rod 20 is termed the vertical circle. Its pivots are fixed at the zenith and nadir. That vertical circle ring 20 is a part of the horizon system. The hour circle 17 is in the equinoctial system.

The pivots for the hour circle 17 are mounted on the slidable ring 15 so as to position the pivots at the north and south elevated poles, or with respect to the poles of the globe elevated to infinity, when the globe axis is positioned according to the observer's latitude. This hour circle rod 17 thus revolves about the globe axis for any tilted position thereof. The vertical circle 20 is pivotally mounted for revolution always about a vertical axis through the zenith and nadir, and its intersection with the hour circle represents the position of a celestial body. The spherical triangle made by the vertical and hour circle rods with a portion of the celestial meridian plane between the adjacent pivots of the hour and vertical circles represents the celestial spherical triangle.

It will be understood that mechanical limitations prevent making the points indicated by pins 16 and 19 on a true circle concentric with the globe.

Various constructional details may be employed to provide these several parts and permit their relative movements. As shown particularly in Fig. 3, the latitude ring 15 is formed of a plate of acrylic resin or other transparent material which is shaped to provide a U-shaped cross section or an internal circumferential groove. This groove interfits with and is slidably mounted on an outwardly projecting circular rib 30 on the ring 18. The latter is carried at the bottom on a U-shaped arm 31 which passes outwardly around the adjacent ring 15, so that it cannot interfere with the sliding movement of the ring 15. This arm 31 is supported by the base 32. The pivot pins 19, which carry the vertical circle 20, extend from the stationary ring 18 through the disk shaped ends 33 of the vertical circle 20.

The celestial meridian 11 is formed, in the construction of Fig. 3, of two transparent plates 35 and 36 spaced apart by arcuate blocks 37 into which the pins 19 project. The blocks 37 are arranged at the top and bottom of the double walled celestial meridian 11 and are connected thereto by screws 38. Thus, by means of the connecting pins 19, which are carried on the fixed ring 18, the celestial meridian 11, formed by plates 35 and 36, is held in a vertical position without hindering the revolving movement of the latitude ring 15 or the rotative movement of the vertical circle 20. The other half ring 17, constituting the hour circle, is outside of the vertical circle (Fig. 2) and free to revolve about its pivots 16. This construction permits the latitude ring 15 to be slid into any desired position and thus carry the hour circle 17 around with it.

The globe 10 is so mounted that it and the equinoctial plane 14 may be tilted as a unit to various angles relative to the horizon ring 12. To this end, a ring 40 (Figs. 1 and 5) concentric with the globe 10 is fitted to revolve slidably within a circular opening in the double walled celestial meridian 11 or with its outer faces in the planes of the outside faces of the two spaced walls 35, 36. The ring 40 is provided with two cylindrical, diametrically arranged holes 41 through each of which a pin 42 freely passes. These pins 42 have diameters which permit them to fit snugly within but slide laterally between the two walls 35 and 36 of the celestial meridian 11. Each globe pin 42 has threaded end portions (Fig. 4) which carry a pair of nuts 43 and 44 threaded thereon. The nuts may be suitably adjusted on each globe axis pin 42, so that one end of the pin may be thrust into the space between the plates 35 and 36 and the other end inserted into a suitable hole in the wall of the hollow globe 10, after which the nuts 43 and 44 are adjusted into position to hold the globe centralized within the ring 40. This construction of pins 42 slidably mounted between the walls 35, 36 permits the globe to be tilted to any angle, such as that shown in Fig. 1. The globe rotates on the pins 42 located at its simulated north and south poles.

It is required that the globe 10 tilt with the bifurcated equinoctial plate 14 and that its supporting ring 40 revolve slidably within the double wall 35, 36. To this end, the plate 14, which is pivotally mounted on the pivots 13 of the horizon ring 12, is made rigid with the ring 40 adjacent to the inner hole 46 (Fig. 2) of the plate 14. That is, the bifurcation represented by the slot 47 extends from the outer edge of plate 14 to the ring 40. The ring 40 is at right angles to the plate 14 and it serves as a primary connection between the two halves of this bifurcated plate. Thus, tilting the plate 14 slides the connecting ring 40 around within the meridan 11 and carries the globe with it. If desired, four arcuate quadrant shaped braces 48 (Figs. 2 and 4) are arranged circularly and cemented in place to project from opposite sides of the bifurcated plate 14 to the ring 40, and these are located substantially perpendicular to the plate 14 so as to provide extra support therefor. Since the ring 40 and the plate 14 are connected to move as a unit, these braces 48 merely strengthen that unit and have no significance. The horizon ring 12, which is perpendicular to the celestial meridian 11, is suitably fixed thereto as by cement and with supporting blocks 49 (Fig. 1) cemented therebetween in suitable locations which are outside of the swinging path of the equinoctial plate 14. The bearings 13 on plate 12 determine the location of the swinging plate 14 and keep it properly centered within the circular opening of the celestial meridian 11. The ring 40 merely slides within the meridian 11, but if desired the parts could have cooperating tongue and groove connections. In the drawings, the various transparent parts, such as plate 14 in Fig. 2, are shown as opaque to avoid confusion, but it is to be understood that the operator can see the parts beneath or behind other parts and so have a full view of the coordinate indicating parts.

The tiltable equinoctial plate 14 has a low circular rib 50 (Figs. 2 and 4) arranged concentrically with the globe through 180° and spaced a short distance from the inner edge 46. A quarter arc segment 52 (Figs. 2, 6 and 7) is slidably and removably mounted on that rib or rail 50. The arc 52 carries two spaced arcuate blocks 53 at its bottom end which are shaped and spaced to grip with a tight fit the concentric faces of the rib 52, so that the arc 52 will stand in position wherever it is slid around on the rail 50. This arcuate member 52 carries a pointer 55 mounted on a U-shaped foot 56 which slidably grips the arcuate upper edge of the member 52. That pointer projects directly outwardly from the center of the globe and may be brought into a line with the position of an imaginary star or celestial body represented by other parts of the apparatus.

For further indicating means, a rod or strip 60 of acrylic resin suitably mounted on the support 32 at the bottom of the apparatus (Figs. 1 and 3) is bent to form a half circle or arcuate support concentric with the globe. It has its two arcuate parts connected at their ends as illustrated and spaced apart uniformly to provide a slideway 61 for a slide member. This slide member comprises two blocks 62 and 63 (Fig. 2) shaped to fit into the slideway 61 which are connected together by a bolt 64 passing through the block and the arcuate space 61, the blocks being clamped against the strip members 60 by a wing nut 65. This slide 62, 63 may therefore be clamped in any position within the 180° arc provided by the arcuate parts 60 which are made slightly longer than a half circle, as illustrated. The slide carries a laterally bent arm 66 having a radial pivot 67 which supports a 90° arcuate or quarter circle member 68. The arm 66 is bent to hold the arc 68 within the general plane of the meridian walls 35, 36. The member 68 made of a bent plastic rod is somewhat longer than 90° and concentric with the globe. One end of the member 68 is pivoted at 67. The outer end of this quadrant 68 has a hole 70 therethrough (Fig. 1) which points towards the center of the globe, no matter how the arm 68 may be swung about its pivot 67 or wherever the pivot may be positioned. Thus, the hole 70 will serve as a locating feature relative to the globe. This hole also serves as a support for any suitably shaped piece intended to indicate the position of a celestial body. The arms 60 and 62 and the pivot 67 permit revolving that body about the globe in a predetermined path, due to the pivot 67 being axially aligned with the globe center.

It will now be appreciated that the two half circular members 17 and 20, representing an hour circle and a vertical circle in the celestial sphere, may be moved relatively by the sliding movement of the supporting ring 15 which carries the hour circle 17, so that their intersection may represent the position of a star or other heavenly body, and the hole 70 may be brought into alignment with that position. These parts therefore illustrate the celestial triangle. If desired for demonstration purposes, a separate unit shaped as a celestial triangle may be made as shown in Fig. 8. This comprises a resin rod 70 shaped as a spherical triangle which is secured at one corner to a disk 75 having a hole 76 therein adapted to be mounted on the upper projecting portion of pivot 16 (Figs. 1 and 3). Thus this member may be mounted as desired to illustrate the spherical angles involved in the position of a star. If desired, the triangle may be formed of three separate rods connected by sliding clamps having pivoted members provided with holes into which the adjacent ends of the rods are slidably clamped by set screws, so that the triangle may be adjustable in size.

A simplified form of apparatus is shown in

Figure 9:
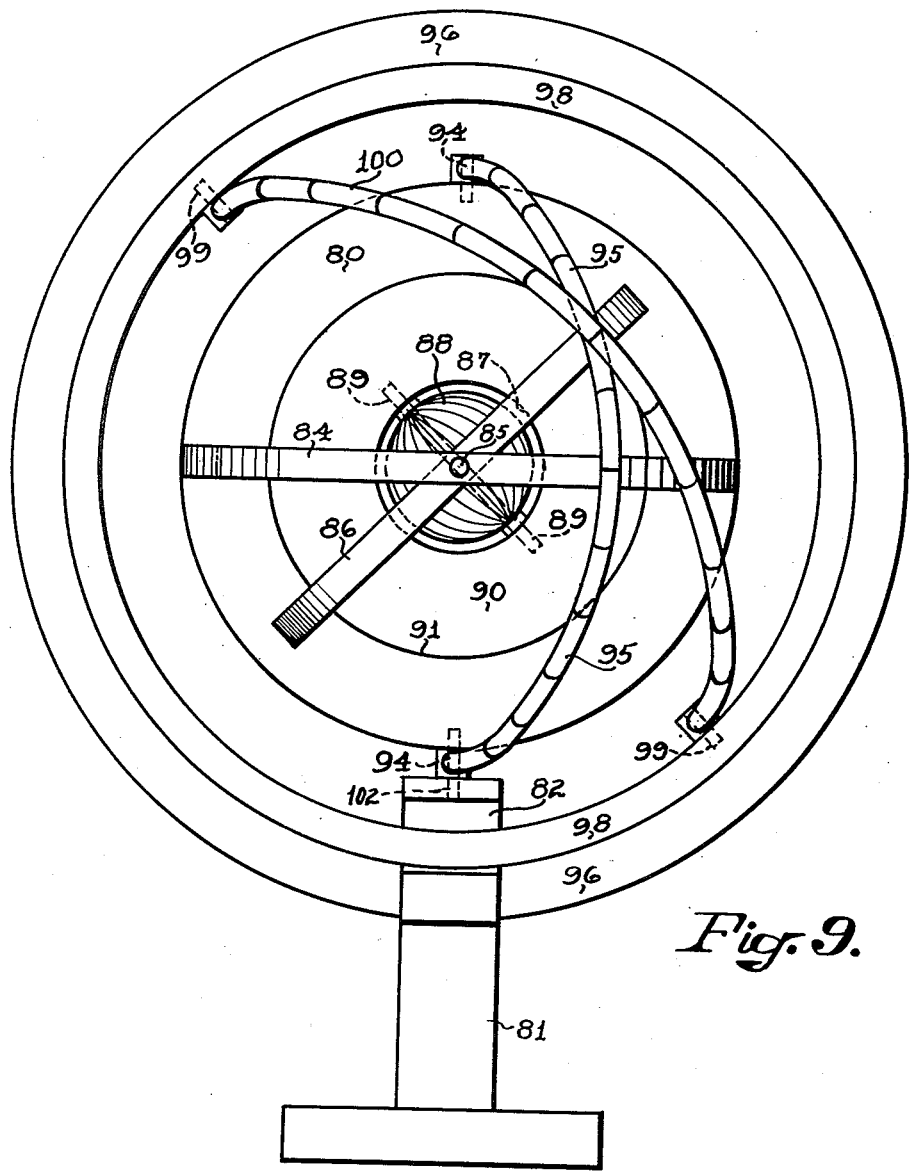
Fig. 9 is a front elevation of a modified form of device.

Figs. 9 to 11 inclusive. The celestial meridian is a single, transparent, acrylic resin ring or annular plate 80 which is mounted to be held vertically on a suitable pedestal 81 by means of a U-shaped metal piece 82 which extends around the support for an hour circle. Fixed horizontally relative to the meridian plate 80 is the horizon plate or ring 84 which has its center in the meridian plate 80. The ring 84 may be formed of two half circular arcuate pieces cemented on opposite sides of the ring 80 and braced by the blocks 83 (Fig. 11) so that the two parts are rigidly connected together at an angle of 90°. The horizon ring 84 has two pins 85 projecting inwardly therefrom at the points indicating east and west, and these pins rotatably carry the annular plate or disk 86 representing the equinoctial plane. That plate is adapted to be tilted to any desired latitude angle. It is shown in Fig. 11 as being in the plane of the horizon and in Fig. 9 is tilted for a north latitude of about 45°. This disk 86 has an inner hole 87 within which the globe 88 is mounted.

The globe 88 has pivot pins 89 projecting from its north and south poles, and these pins are suitably mounted within holes in a second plate or connecting ring 90 concentrically mounted within the meridian plate 80 and forming a continuation of the meridian plane represented thereby. The joint between the concentric rings 80 and 90 may be formed of cylindrical faces 91 (Fig. 10) in bearing contact. The ring 90 is fixed to the equinoctial plate 86 by blocks 92 (Fig. 11) cemented at the 90° corners therebetween, so that the ring 90 connects the two parts of the bifurcated equinoctial disk 86 and they must rotate as a unit about the bearing pins 85. Thus, the cylindrical bearing faces 91 (Fig. 10) are held properly in a sliding contact as the connecting ring 90 slides around within the plate 80. The outer faces of the inner slidably rotating part 90 are always in the planes of the faces of the outer ring 80 and the two parts present a vertical meridian plate which may be considered as being always in the plane of the globe axis.

The annular meridian plate 80 has two outwardly projecting pins 94 (Figs. 9 and 10) representing the zenith and the nadir at the top and bottom of the plate. The vertical circle is represented by the half circle rod 95 of resilient acrylic resin, which has its disk shaped ends sprung into place with its bearing hole pivotally mounted on the two pins 94. That vertical circle 95 corresponds in shape and use with the rod 20 of Fig. 1. It has graduated markings 15° apart to represent 12 hours. A single bearing may serve to mount either the vertical or the hour circle rod.

A vertical supporting plate shaped ring 96 is suitably fixed on the pedestal 81 in alignment with the rings 80 and 90. That ring 96 has an inwardly projecting ridged surface or slideway 97 (Fig. 10) adapted to interfit with a correspondingly shaped recessed surface in an inner ring 98 mounted concentrically within the ring 96 and with aligned faces. This forms a tongue and groove connection which permits the inner ring 98 to slide around in a vertical plane, just as ring 15 of Fig. 2 moves. That ring 98 carries on pivots 99 projecting inwardly therefrom a half circle resin rod 100 which, in this case, represents the hour circle. The pivots 99 represent the elevated earth poles. Thus rod 100 may be moved around to different positions relative to a vertical by sliding the ring 98 in its slideway 97. The mount for the celestial meridian plate 80 and associated parts does not interfere with the movement of the ring 96 because of the U-shaped portion 82 of the support which passes around and to one side of the rings 96 and 98 and their pivot connection with the half circle rod 100. Thus the rod 100 may be swung through nearly 360°. The pivot 94 or 99 may be made long enough to carry the spherical triangle of Fig. 8.

The meridian plate 80 is supported on and connected to the top arm of the U-shaped support 82 by means of the round pin 102 fixed in a hole in the arms 82 and cemented within a vertical hole in the resin plate 80. The middle portion of the pin 102 is cylindrical and forms the nadir pivot bearing 94 for the lower end of the swinging rod 95 that serves as the vertical circle. The various accessories described with reference to the modification of Figs. 1 to 8 may also be incorporated in the construction of Figs. 9 to 11, but they have been omitted for clarity of illustration.

This apparatus may be used to demonstrate various types of celestial and astronomical navigation problems and principles. For example, the device may be set up so that the observer is always at the west position, and because of the transparency of most of the parts he may observe a celestial triangle or other characteristics that are to be found in the east without having to turn the apparatus around. A student may observe the entire collapse of the celestial triangle as the body approaches the meridian without having to change his position. Thus the apparatus is especially adapted for demonstration before a class of many members.

To demonstrate the observer's latitude of, say 60° north, the equinoctial ring 14 (Fig. 1) or 86 (Fig. 11) is turned on its bearings in the horizon ring 12 or 84 to an angle of 60° from the zenith or so that the poles of the globe make an angle of 60° from the north point on the horizon ring 12 or 84, as shown in Fig. 1. The angle is 45° in Fig. 9. The ring 15 or 98 which carries the hour circle 17 or 100, is also revolved in the plane of the celestial meridian ring to position the pivots 16 or 99, representing the extension of the globe poles to infinity, so that the axis of these pivots also makes an angle of 60° for Fig. 1 and 45° for Fig. 9 with the horizon ring. Then a star body may be considered as being a mark or an object mounted in a certain position on the hour circle 17 or 100, and its movement about the globe and with reference to the horizon ring will indicate the rising and setting of the star and other characteristics of its travel. A position of 60° south latitude will be measured from the south point on the horizon ring and the south elevated pole will be moved up to a position above the horizon ring by suitably revolving the carrier ring 15 or 98. That is, the south elevated pole will be moved up to a position of 60° above the horizon ring and the various demonstrations of star movement may be then considered as taking place in the southern hemisphere of the earth, although the observer is viewing the upper half of the apparatus.

To demonstrate the position of a body on the vertical circle 20 or 95, the altitude of the body is the angular degree or distance above the horizon measured along the vertical circle rod. Its distance from the zenith is the co-altitude, it being noted that the vertical circle is pivotally mounted at the zenith and nadir. If a body is positioned at 30° above the horizon ring 12, then its altitude is 30° and its zenith distance is 60°.

The azimuth is an angle measured clockwise from the true north point of the horizon. This is the angle at the zenith between the celestial meridian and the vertical circle when the latter is located to pass through the body, or the same arc may be measured along the horizon. Thus, one may swing the vertical circle rod 20 or 95 to an assumed angular position of the celestial body and then measure that angle clockwise from the north point mark on the horizon ring 12 or 84. The observer is considered to be positioned at the center of the globe directly beneath the zenith represented by pivot 19 or 99.

To demonstrate various coordinates on the equinoctial system for any given latitude, such as 60°, a celestial body is considered to be located on the hour circle rod 17 or 100 and to move from east to west around the globe in accordance with its apparent movement, as the earth rotates from west to east. The position of the body, as above stated, is considered to be at the intersection of the hour circle and the vertical circle as they are moved around the globe in the apparent daily path.

The declination of a celestial body is the angular distance north or south of the equinoctial plane measured on the hour circle. The body represented by the intersection of the vertical and hour circles in Fig. 1 has a north declination of about 7°. As the body passes from the east towards the west it transits the celestial meridian represented by the ring 11 or 80 when the hour circle swings past the vertical meridian plate 11 or 80. The body sets when its location on the hour circle passes below the horizon ring 12 or 84. On the vernal and autumnal equinox, for example, the sun is on the equinoctial and swings with its hour circle always in the plane of the equinoctial. The apparatus thus readily demonstrates the difference in length of day between the short and long days. In the summer in the north latitude the sun is considered to be above the equinoctial plane 14 or 86 by a given angle depending upon the time of the year, such as about 23.5° at June 21. Since the hour circle rod 17 or 100 on which the sun is presumed to be positioned always swings about the globe axis, the sun will travel through more than 180° or for more than a 12 hour day between its two points of intersecting the horizon ring.

If the observer is at the north pole, then the pivots of the globe and its equinoctial ring as well as the pivots for the hour circle will be vertical. Consequently, the path of the sun marked on the hour circle will swing parallel with the horizon and at a distance above the horizon depending upon the time of the year or the altitude of the sun. That is, for the observer at the pole, the equinoctial and the horizon lie in the same plane, and therefore when the sun is above the horizon it must swing around without setting for half of the year. Similarly, for the other half of the year, the sun on its hour circle will swing always below the horizon and thus will not be visible. If the observer is positioned at the equator, then the poles of the globe 10 or 88 are set in the plane of the horizon ring and the hour circle has a horizontal axis, so that at the equator the sun or other celestial body travels in a plane which is parallel with the equinoctial plane or perpendicular to the horizon. Similarly, the device may show the daily paths of bodies and why some stars never set and others are never seen at a given latitude.

The hour angle is that angle at the pole or that arc on the equinoctial plane between the celestial meridian and the hour circle of a celestial body. This is measured westerly from the upper branch of the meridian along the equinoctial to the position of the hour circle. The measurement is made westerly because the body moves in an apparent movement toward the west.

The geographic position of a celestial body is the position radial of the globe 10 or 88, representing the earth, where that line cuts the globe. That is, the body is directly overhead and at the zenith for its geographic position. The declination of the body is the latitude of its geographic position. Hence, the globe and associated parts are moved to bring the body to the zenith and the tilt of the globe axis represents its latitude.

The celestial triangle is the triangle formed by the vertical and hour circles with that arc on the celestial meridian lying between the adjacent hour and vertical circle pivots. The co-latitude of the body is the angle from the zenith to the elevated pole. The arc on the hour circle within this triangle is the co-declination of the body and the arc on the vertical circle is its co-altitude.

The meridian angle "t" is the angle at the pole between the meridian and the hour circle for the body. It is measured east or west from the upper branch of the meridian from zero to 180° and depending on which pole is elevated. The azimuth angle "z" is the angle at the zenith between the meridian and the vertical circle of the body, measured east or west from the meridian to the vertical circle from zero to 180°. The third angle in the celestial triangle between the hour and vertical circles is known as the position angle.

To demonstrate different types of time, such as sidereal time, the equinoctial disk is tilted to be vertical and in line with the zenith, with the globe poles in the plane of the horizon. The vertical circle rod is moved to be inside of the meridian plane and out of the way, or it may be removed by springing the resilient rod out of its pivot bearings. A half section (90 degrees) of an hour circle rod is provided, and its one bearing is removably mounted on the hour circle bearing at the south point of the horizon. If desired, a duplicate hour circle rod (180°) may be used and its two bearings are mounted regularly. The pivot pins are made long enough to take the bearings of the two hour circle rods. The axis of the two hour circles is brought into alignment with the globe poles, so that the hour circles revolve about the horizontal globe axis. By means of the two hour circles, one may demonstrate both sidereal and solar time simultaneously. One rod represents the hour circle of the sun or solar time and the other rod represents the hour circle of the vernal equinox to which sidereal time is measured. Also, the sidereal hour angle and right ascension may be demonstrated by this construction.

It will now be appreciated that the above and other coordinates and celestial motions and characteristics may be readily demonstrated by this apparatus and that the observer may visualize the positions and movements of celestial bodies by appropriate manipulation of the transparent plates, circles, rings and other parts of the apparatus.

In the claims, the various constructional features have been designated by their functions for the sake of brevity. Also, the term plane has been used herein to designate structures as if the various parts had no thickness, but it will be understood that they are to be viewed as representing celestial planes and paths of motion and that the user of this teaching aid should visualize spheres as well as celestial paths related to these planes.

It will be appreciated that various equivalent constructional features may be employed, as will be suggested by the above disclosure. For example, the arrangements of the parts may be varied or reversed, such as mounting the tiltable annular equinoctial disk outside of the horizon plate, but with the same functions for the parts. Whether or not a globe is used, the center point of the system represents an observer's position. Hence the above description is to be interpreted as describing the principles of the invention and the preferred embodiments but not as imposing limitations on the accompanying claims.

I claim:

1. An astronomy teaching device comprising a fixed vertical meridian plate having a central opening, a plate shaped horizon ring fixed perpendicularly to and with its center in said plate opening, a globe rotatably mounted in the opening at the center of the ring which designates an observer's position, and an arcuate vertical circle member mounted on a vertical axis lying in the plane of said plate for revolving about the globe.

2. An astronomy teaching device comprising a fixed vertical meridian plate having a central opening, a tiltable equinoctial disk perpendicular to the plate and having a central opening, a horizon ring fixed horizontally relative to the plate with its center in said plate opening, diametrically aligned pivots on the ring which are perpendicular to the meridian plate and tiltably support the disk within the ring, a globe pivotally mounted on the plate in said opening for rotation about an axis at right angles to the disk, and an hour circle member pivotally mounted to revolve about the axis of the globe.

3. An astronomy teaching device comprising a fixed vertical meridian plate, a horizon ring fixed horizontally with its center in said plate, a tiltable equinoctial disk pivotally mounted diametrically on and located within the horizon ring, a vertical circle member revolvable about a vertical axis on the meridian plate, and an hour circle member mounted on a movable pivot to revolve about the center of and on an axis perpendicular to the equinoctial disk.

4. An astronomy teaching device comprising a horizon system having a fixed vertical meridian plate, a fixed horizon ring mounted horizontally with its center in said plate, and a vertical circle member revolvable about a fixed vertical axis in the plane of the plate, and an equinoctial system cooperating with said vertical meridian plate and comprising a tiltable equinoctial disk perpendicular to the plate and pivotally mounted diametrically on and located within the horizon ring, the center of the disk designating an observer's position on the earth, and an arcuate hour circle member revolvable about said position on an axis perpendicular to the equinoctial disk.

5. A device according to claim 4 comprising a latitude ring mounted for revolution relative to and in the plane of the meridian plate which has diametrically arranged pivots, and a semi-circular rod forming the hour circle which has pivot bearings at its ends mounted axially aligned on the ring pivots, so that the hour circle may be adjusted to revolve about an axis perpendicular to the plane of the equinoctial disk.

6. An astronomy teaching device comprising a vertical meridian plate having a central opening, a horizon ring fixed horizontally with its center in the meridian plate, an equinoctial disk having a central opening, a globe rotatably mounted within the disk opening, diametrically arranged pivot bearings on the horizon ring having an axis at right angles to the meridian plate which tiltably support the equinoctial disk within the ring for a latitude adjustment, means for supporting the globe so that the globe axis may be adjusted to represent a given latitude, and members mounted to revolve about the globe which indicate the relative positions and motions of a celestial body.

7. An astronomy teaching device comprising a fixed vertical meridian annular plate, a horizon ring fixed horizontally with its center in the plate, a bifurcated equinoctial disk diametrically bisected by the vertical plate, pivots on and located diametrically of the horizon ring which support said disk within the ring on a horizontal axis perpendicular to the meridian plate for tilting the disk relative to the horizon ring, said disk having a central opening, a globe rotatably mounted within said opening and with its axis perpendicular to the disk, said globe being arranged to tilt with the disk to latitude designating positions, an arcuate vertical circle rod pivoted in the vertical plane of the meridian plate to revolve about the globe and an arcuate hour circle rod pivoted to revolve about the globe axis.

8. A device according to claim 7 comprising connecting ring slidably mounted within the opening of and lying substantially in the plane of the vertical meridian plate, said connecting ring being secured to and connecting the two parts of the equinoctial disk on opposite sides of the meridian plate and axially supporting the globe, and said connecting ring revolving within the meridian plate opening as the equinoctial disk is tilted on its axis.

9. An astronomy teaching device comprising an annular vertical meridian plate, a horizontal horizon ring fixed with its center in said plate, a latitude ring concentric with and slidably mounted for revolution around the center of and in the plane of the meridian plate, an arcuate hour circle rod arranged to revolve about the globe, a pivot on the latitude ring which supports the hour circle rod and provides for its adjustment into axial alignment with the globe so that the hour circle rod may revolve concentrically about the globe axis for any tilted latitude designating position of the globe.

10. A device according to claim 9 comprising an arcuate vertical circle rod shaped to revolve about the globe and a pivot which supports the same for revolution about a vertical axis, the hour and vertical circle rods cooperating with the latitude ring to form a celestial triangle.

11. A device according to claim 9 which comprises an arcuate support fixed relative to and in the plane of the meridian plate, a pivot movable along the support, and an arcuate body swingingly mounted on said pivot which is so arranged that a part thereof indicating a celestial body may swing about the globe in a direction determined by the location of its pivot.

12. A device according to claim 9 in which the ring, disk and plate are made of substantially transparent material so that celestial coordinates may be demonstrated in all quadrants from a given viewpoint.

13. A device according to claim 9 comprising a body shaped as a spherical triangle which has a pivot bearing near one angle thereof, the hour circle pivot being so arranged that the pivot bearing may be mounted thereon to demonstrate a celestial triangle.

14. A device according to claim 9 comprising an arcuate slide member mounted on the equinoctial plane concentric with the globe center, an arcuate support slidably mounted on the slide member which is concentric with the globe and a pointer on the support pointing axially of the globe which is movable to indicate a star position.

15. A device according to claim 9 comprising a stationary vertical annular support having a circular periphery, the latitude ring being slidably mounted on the support periphery and having an inwardly projecting pivot for the hour circle rod, the meridian plate being an annular member arranged concentrically within the annular support and spaced from the ring and having an outwardly projecting pivot for the vertical circle rod, the vertical and hour circle pivots being radially spaced so that they may be moved without interference.

16. An astronomy teaching device comprising transparent plate members representing a vertical meridian plane, a horizontal horizon plane fixed relative to the meridian plane and an equinoctial plane tiltable relative to the horizon plane, a globe mounted for rotation about an axis perpendicular to and axially tiltable with the equinoctial plane so that its angle of tilt may represent latitude, and members mounted to move about the globe which represent vertical and hour circles.

References Cited in the file of this patent

UNITED STATES PATENTS

| Number | Name | Date |
|---|---|---|
| 320,999 | Berneike | June 30, 1885 |
| 855,226 | Bryant | May 28, 1907 |
| 1,148,891 | Coultrap | Aug. 3, 1915 |
| 2,466,225 | Gee | Apr. 5, 1949 |